United States Patent [19]

Pesch

[11] 4,325,898

[45] Apr. 20, 1982

[54] METHOD OF OPERATING A PLATEN PRESS

[75] Inventor: Jürgen Pesch, Krefeld-Traar, Fed. Rep. of Germany

[73] Assignee: G. Siempelkamp GmbH & Co., Krefeld, Fed. Rep. of Germany

[21] Appl. No.: 185,161

[22] Filed: Sep. 8, 1980

Related U.S. Application Data

[62] Division of Ser. No. 127,572, Mar. 6, 1980, Pat. No. 4,289,467.

[51] Int. Cl.[3] .............................................. B29J 5/00

[52] U.S. Cl. .................................. 264/40.5; 264/109; 425/141

[58] Field of Search ................ 264/40.5, 109; 425/141

[56] References Cited

U.S. PATENT DOCUMENTS 2,956,307 10/1960 Fahrni ................................ 264/40.5

3,860,381 1/1975 Pesch .................................. 264/109

*Primary Examiner*—James R. Hall

*Attorney, Agent, or Firm*—Karl F. Ross

[57] ABSTRACT

A platen press, and a method of operating same, for the planar and parallel pressing of particle board and like materials comprises a press bed and a press plate, one of which is movable and is provided with a hydraulic system for developing the pressing force. A pair of spacer bars are provided on the press bed to flank the particle board and a set of bearing cylinders urges the movable press member to clamp the movable member against the spacers, thereby imparting a bend or distortion to the movable press member. According to the invention, this distortion is measured and the measured value is used to operate the main press cylinders to eliminate the distortion and ensure parallel compression of the particle-board mass.

1 Claim, 4 Drawing Figures

METHOD OF OPERATING A PLATEN PRESS

This is a division of application Ser. No. 127,572 filed Mar. 6, 1980, now U.S. Pat. No. 4,289,467.

FIELD OF THE INVENTION

My present invention relates to a method of operating an apparatus such as a platen press for the compression of mats of pressable material, especially mats of wood, cellulosic or like materials for the production of pressed board.

BACKGROUND OF THE INVENTION

With conventional methods for the production of pressed board, platen presses or the like are provided in which a mat of material capable of fusion to form the pressed the pressed board is compressed between two planar surfaces, generally forming the bedplate and headplate of a platen press.

Typical of the systems provided for this purpose is that of my U.S. Pat. No. 3,860,381 and the earlier systems described or referenced in that patent or in the file thereof.

The term "pressed board" is generally referred to in its most generic sense to identify headboard, i.e. material of high structural strength, low fluid permeability and excellent surface characteristics, as well as to less dense and highly porous boards which may be used as thermal or acoustical insulation for interior finishing or the like. The term is generic to any relatively rigid generally flat board structure, formed by compression utilizing both heat and pressure, to bond fibers, chips or dust of wood or some other material, e.g. a cellulosic material, with intrinsic thermally activatable binder or an added binder, the board being pressed from a structure which, for convenience, will be defined as a mat.

The term "mat" is used herein likewise in its most generic and general sense to refer to a layer of more or less coherently interrelated particles and the binder.

The aforementioned publications describe how such materials may be introduced into a platen press and how the finished board may be carried away for further processing.

It is known to provide a platen press for the compaction of particle board mats, i.e. for the production of chipboard, fiberboard and sawdust board, which comprises a press frame or support structure, a fixed press plate or bed, a movable press plate or bed, and a multiplicity of working cylinder arrangements which are disposed symmetrically with respect to a vertical median longitudinal plane through the press. The working cylinder arrangements will each be understood to include at least one cylinder and at least one piston, either the cylinder or the piston being connected to the press support or frame while the other of these members is connected to the movable press plate.

Such systems have also been provided heretofore with a plurality of auxiliary piston-and-cylinder arrangements which can be used to modify the orientation of the movable press member so as to ensure generally parallel pressing of the board. Naturally, control systems can be provided for the hydraulic piston-and-cylinder arrangements.

The movable and stationary press beds are generally formed with pressing plates which can be heated, e.g. electrically or by fluid-heating techniques, the movable and/or stationary beds each including, in addition to the respective press plate, a plurality of beams which generally extend transversely of the longitudinal axis of the press and serve as points of attack for the hydraulic cylinder arrangements.

Naturally, for high quality pressed board, it is desirable that the compression be of the parallel type. The term "parallel compression" is used herein to indicate that the upper and lower faces of the pressed board, at least as the latter emerges from the press, are as closely parallel as possible. Since these surfaces are also usually planar, reference may also be made to plane-parallel surfaces.

Plane-parallel surfaces of a pressed board indicate that neither surface has bulges which can be considered as deviations from planarity; furthermore the parallel requirements specifies that the board be of uniform thickness throughout its length and breadth.

Obviously, for plane-parallel compression of the pressed-material mat, it is essential to compensate for any elastic deformation of the pressing beams, the beds or the pressing plates.

A pressing frame, in accordance with the present description, is intended to include any type of press support commonly in use. For example, the press support may be a post structure carrying in bed and upon which the upper member of the press is mounted, e.g. a headplate, or a row of portal frames spaced apart in the longitudinal dimension of the press. A system of the latter type is shown for the platen press of U.S. Pat. No. 3,860,381.

The movable press member or bed can be either the upper or the lower bed.

The movable press bed is generally lighter than the fixed press bed and, when the deformation of the press beds is considered, is the more readily deformed member.

If parallel compression of the mat and the boards is desired without compensation by the prior-art techniques, one must either resort to extraordinarily massive press beds, incapable of any deformation during the pressing operation, or must accept a certain degree of convex or concave curvature resulting from the distortion of the movable press bed.

It is possible, following the pressing operation, to remove the convex or concave curvature in the pressed board by expensive and time-consuming shaping, material-removal or like aftertreatments.

The principles of the present invention, as will be described hereinafter, are applicable to the single-stage or single-level platen presses of the type described in the aforementioned patent as well as to double-level or two-stage presses as likewise have been illustrated therein. In the latter case, the fixed press bed is the intermediate bed, the upper and lower plates being movable. The invention is also applicable to multilevel presses in which the press plates between the stages are movable. In this case, of course, the parallel compression must be dealt with as a sum so that the individual distortions of the intervening plates as well as the upper or lower movable plate can be compensated. Finally, the system of the present invention will be understood to be applicable as well to the compression of asbestos cement plates or boards and the like.

The prior-art apparatus, represented for example in German patent document (open application - Offenlegungsschrift) DE-OS No. 15 02 042, is shown as a single-level press. In this apparatus, the working piston-and-cylinder arrangements are disposed outwardly, as seen in plan view, of the longitudinal median plate of the press and their respective points of attack lie inwardly of the spacer bars which are provided between the press plates to establish the thickness of the pressed board to be formed in the press.

The auxiliary piston-and-cylinder arrangements, provided primarily to equalize or compensate for distortion of the movable press plate, are disposed generally in the region of the longitudinal vertical median plane of the press. These auxiliary cylinders thus act as compensating cylinder arrangements which are intended to level the aforementioned deformations of the movable press member under the control of a control arrangement or device.

The movable press member, in the operation of the conventional apparatus, is initially displaced by actuating all or individual ones of the compensating cylinder arrangements downwardly until the press plate comes to lie on the mat to be compressed.

During this step, the working cylinders are merely entrained. The respective pressurizable compartments behind the pistons of these cylinders are, of course, filled with fluid, e.g. from an accumulator or storage vessel, although an elevated pressure is not generated in these compartments during the entrainment phase.

When the press plate contacts the mat, the working cylinders are actuated so that their pistons apply the full pressure to the plate and are driven by the full hydraulic pressure in the compression mode. This, of course, forces the upper or movable press plate downwardly to compact the mat.

As already implied, the working cylinders are disposed relatively far from the spacer bars. As a consequence, upon compression of the mat, depending upon the nature of the material pressed and the height of the layer forming the mat, the movable press plate deforms or bulges to a greater or lesser extent together with the pressing beam.

When the pressing plate of the movable bed engages the spacer bars, the pressure in the working cylinders increases markedly.

Pressure-sensing devices respond to this pressure increase and generate a control pulse which cuts off the main cylinders and, in some cases, relieves them. By contrast, the compensating cylinders generally remain under the working pressure to compensate for the bulging or deformation of the movable press bed.

If the bulge is in the direction of the fixed bed, the corresponding compensating cylinder is relieved. Conversely, if the bulge is in the direction opposite the fixed bed, the compensating cylinder may be additionally pressurized. Naturally, the compensating operations must be determined experimentally for each type of mat, for each board-producing program, for the various pressure levels and pressing periods operating in the press.

Even with these empirical derivations of the response to be made by the compensating cylinders, one cannot completely exclude significant variations resulting from changes in the nature of the mat or the like. The same applies for the significant variations in the counterpressure generated in the mat and opposing advance of the movable press plate during the pressing operation and resulting from premature hardening of the binder or variations in the moisture level in the particle material of the mat under the effect of heat from the heating plates.

As a consequence, the response of the movable press plate to the particular pressing operation cannot always be determined in advance and, even when determined in advance, is not necessarily constant or reproducible.

As further consequence, the control method of the prior art is extremely complicated and must permit relatively large tolerances. It is, therefore, practically impossible with the prior-art systems to provide plane parallelism of the pressed boards with extremely narrow or small tolerances.

Another disadvantage of the prior-art systems is that significant moments are generated between the main cylinders and the spacer bars in the press plates so that the press plates can impart to the boards a substantially corrugated surface which must be sanded down or otherwise treated. This is especially the case when the movable press bed is made relatively light to save material and hence is especially bendable.

Reference may be had to German patent document (printed application - Auslegeschrift) DE-AS No. 17 03 297 in which similar problems may arise although spacer bars are avoided and the working cylinders or main cylinders are provided at the outer edges of the movable press bed or plate.

Another system is represented by German patent document (utility model - Gebrauchsmuster) DE - GBM No. 19 24 142 in which the main cylinder arrangements are disposed along the edge of the movable press bed and the press plates are so arranged that these main cylinders lie directly above the spacer bars. This, however, precludes a proper compensating operation to overcome deformation of the movable press bed or plate.

OBJECTS OF THE INVENTION

It is the principal object of the present invention to provide a method of operating a press, particularly a platen press, for the pressing of particle-board mats whereby the finished product can be of high planar parallelism and with limited tolerances, while avoiding the disadvantages of earlier systems as enumerated above.

It is another object of this invention to provide such an improved method of operating a platen press as will eliminate the drawbacks of the earlier systems described.

The method of the present invention has as a further object the provision in a press for the purposes described of a movable press bed which can be given a statically determined position for each pressing operation so that compensation of the deformation of the press plate can be effected simply and readily.

SUMMARY OF THE INVENTION

These objects and others which will become apparent hereinafter are attained, in accordance with the invention, in a method of operating a platen press for the compaction of particle-board mats the press comprising a fixed plate, a movable plate, and main fluid-operated cylinders effective to generate the pressure required to convert the mat into pressed board and acting upon the movable plate.

According to the invention, the mat is flanked by spacer bars which rest upon the fixed plate and the auxiliary cylinders are formed as bearing cylinders, positioned over the spacer bars, so as to press the movable plate against these bars and thereby retain the movable plate against these bars during the subsequent operation of the main cylinders.

According to another essential of the invention, means is provided to respond to deformation of the movable plate, such means forming part of the control system for the main cylinders so that the latter are actuated in response to deformation to the movable plate to level such deformation and ensure parallel compression of the mat.

During this latter operative step, the movable plate acts as a beam supported at two spaced-apart locations of pedestals, corresponding to the spacer bars against which the beam or platen is held.

The term "plate" has been used above to refer to the movable platen and thus is utilized in its most general sense to mean the movable press member which compacts the mat and which can be heated as described previously. Naturally this movable platen can include any beams or bed structure to which the cylinders are connected and any plate or the like attached to such bed structures or actual engagement with the mat and the spacer bar. The bed structure may be formed by another plate or by an array of girders, crossbeams, spars or the like. Since the spacer bars are disposed outwardly of the mats to flank the latter, the auxiliary or bearing cylinders likewise are disposed outwardly of the main cylinders.

The term "cylinders" as used above and subsequently herein is intended to refer to fluid-operated ram or jack structures which may also be described as piston-and-cylinder arrangements. In such arrangements, a piston is telescopically slidable in a cylinder chamber or cylinder proper being displaced by pressurization of a compartment behind the piston, generally with a liquid medium. While the cylinder preferably bears upon a fixed support structure, e.g. a portal frame as described above, and the piston then acts upon the movable press bed, a reverse kinematic construction is also possible whereby the piston is affixed to the stationary support while the cylinder acts upon the movable bed.

Thus the system of the present invention distinguishes from the state of the art mentioned previously by utilizing the auxiliary piston-and-cylinder arrangements as bearing cylinder units which apply force directly to the movable bed in line with the spacer bars to clamp the spacer bar between the bearing cylinder and the fixed bed of the press, while the control means for the main cylinders includes the deformation-measuring device which responds to deformation of the movable press bed and controls the main cylinders in response to the measured deformation to displace the movable bed so as to level the deformation and ensure parallel compression.

From elementary statistics, the statically determined problem in analyzing the response of beams on two supports is well known. Correspondingly, a plate or platen which rests upon two spaced-apart supports and is held thereagainst at its edges, presents a statically determined problem.

Thus, in accordance with the method of the present invention, the press plate of the movable press bed is initially brought to bear upon the mat to be compressed, either with the bearing cylinder arrangements or with the main cylinder arrangements or both.

Generally it is more convenient to advance the movable bed with the bearing cylinders and to simply entrain the working or main cylinders with the movement of this bed.

Next, the bearing cylinders forcibly apply the movable bed to the spacers to form the statically determined structure of a plate mounted upon the supports in the manner described. In general this will result in a convex deformation of the movable press bed and its plate, which deformation can be readily measured and determined.

When reference is made to deformation measurement of the movable bed it should be understood that the deformation measurement can be made upon the press beams or upon the plate proper since deformation of the one is followed or produces deformation of the other.

The operation of the main cylinders is so controlled that this deformation is compensated and hence a parallel compression is applied to the mat which is automatically maintained during any further compression.

In order to exclude the tapering of the pressed board during the pressing to one edge, a preferred embodiment of the invention provides that the auxiliary or bearing cylinders are pivotally connected to the support and to the movable bed. This, of course, means that the piston is hinged to either the frame or the movable bed while the cylinder proper is hinged to the other.

According to another feature of the invention, the spacer bars have a width such that the bearing force, i.e. the force applied by the bearing cylinders, is spread by the bars and permanent (plastic or inelastic) deformation of the beds and the respective plates of the press are avoided.

Indeed, German patent document (printed application—Auslegeschrift) DE-AS No. 16 53 187 describes relatively wide spacer bars, although not in an equivalent relationship to bearing cylinders or the like.

The movable press bed of the present invention is advantageously comparatively light and preferably is so designed as to be elastically deformable but not compressible under the standard pressing forces which are used. Naturally, this means that both the beams of the movable bed and the press plate thereof should be elastically deformable. This guarantees light-weight construction of the movable platen and makes the system more responsive to the control operation described above.

While the deformation measurement can be effected by any conventional means it is preferred to provide the deformation-measuring device as a strain gauge whose strips are mounted upon the beams or the plates of the movable bed.

The output of the strain gauge can be used by applying it to a conventional control circuit to operate the hydraulic system by techniques well known in the control arts and which do not themselves form a part of the invention.

The system of the present invention has the advantage that it utilizes a statically determined position for the press plate at the beginning of the deformation-compensation operation and hence also makes use of statically determined responses of the disadvantages described previously. A relatively simple control system can be provided for this purpose.

BRIEF DESCRIPTION OF THE DRAWING

The above and other objects, features and advantages of the present invention will become more readily apparent from the following description, reference being made to the accompanying drawing in which.

Figure 1:
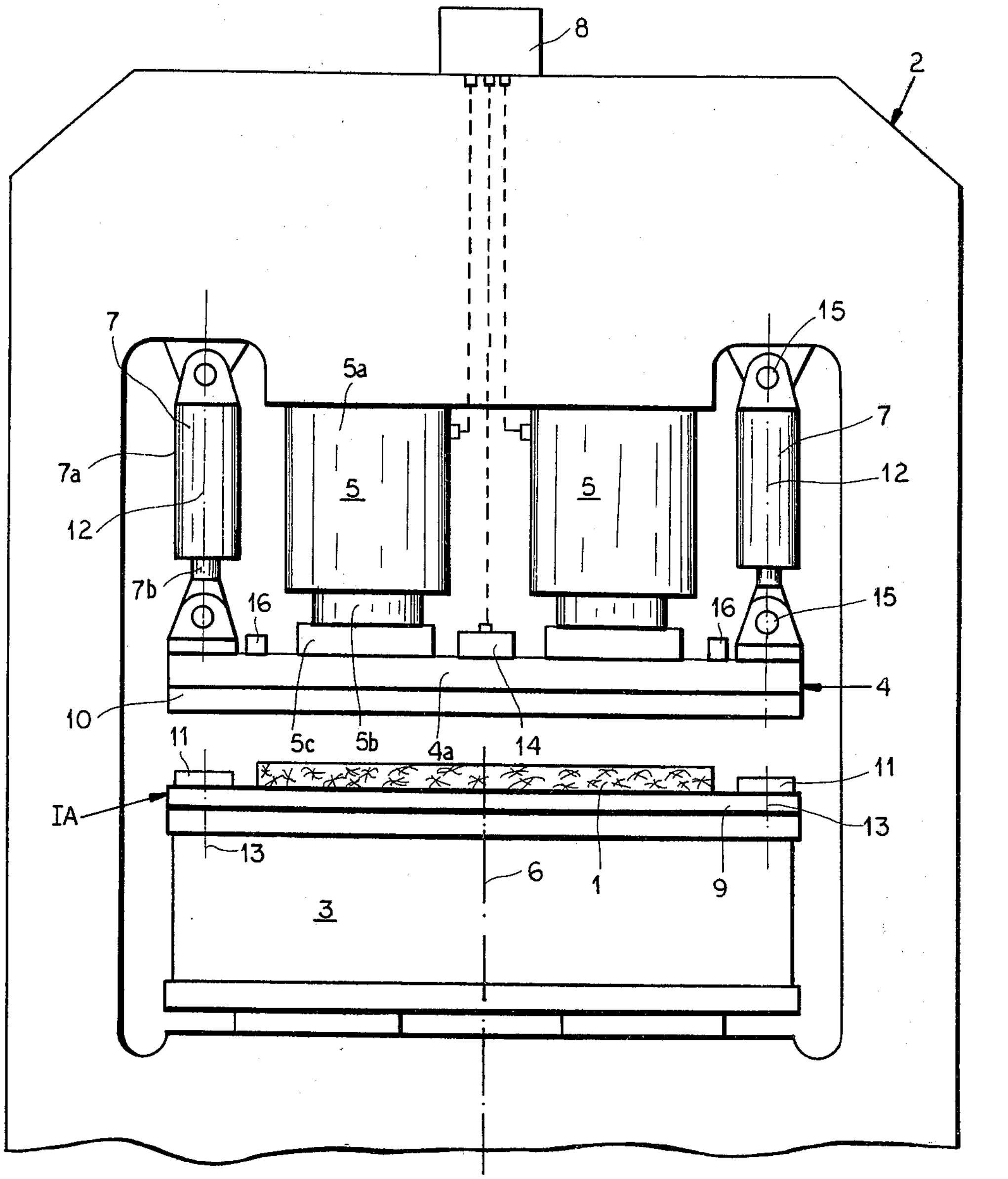
FIG. 1 is a diagrammatic elevational view of a platen press according to the invention at the beginning of the press-closing operation.
Figure 1A:
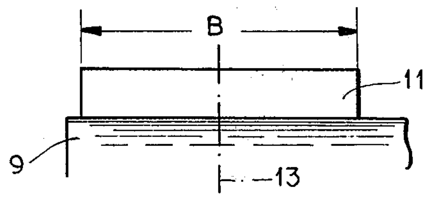
Figure 2:
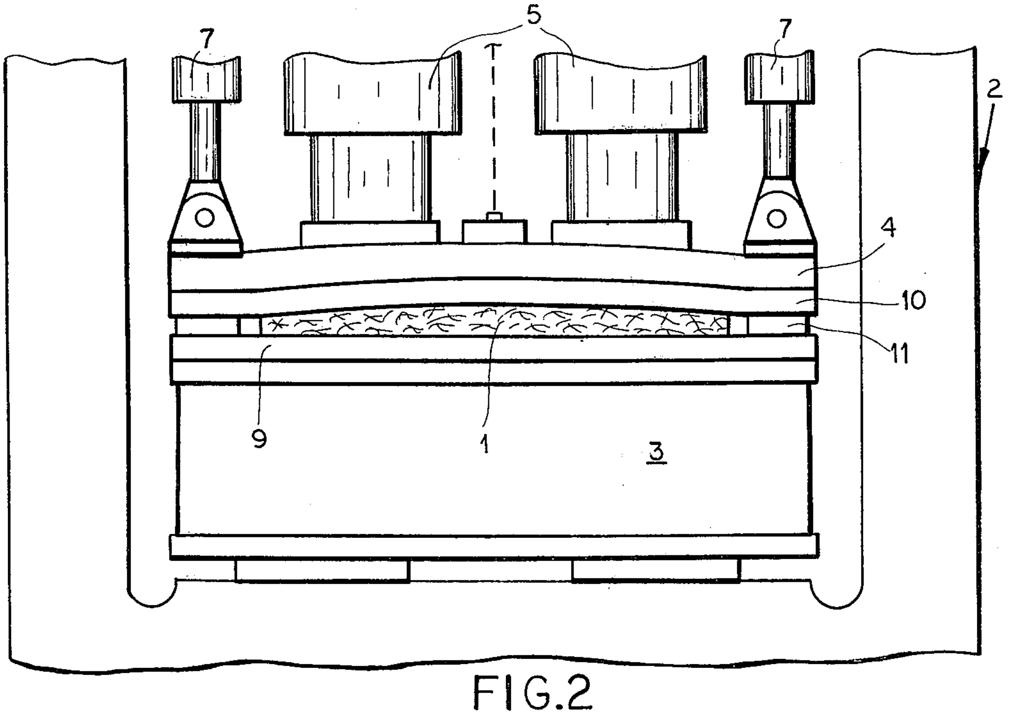
Figure 3:
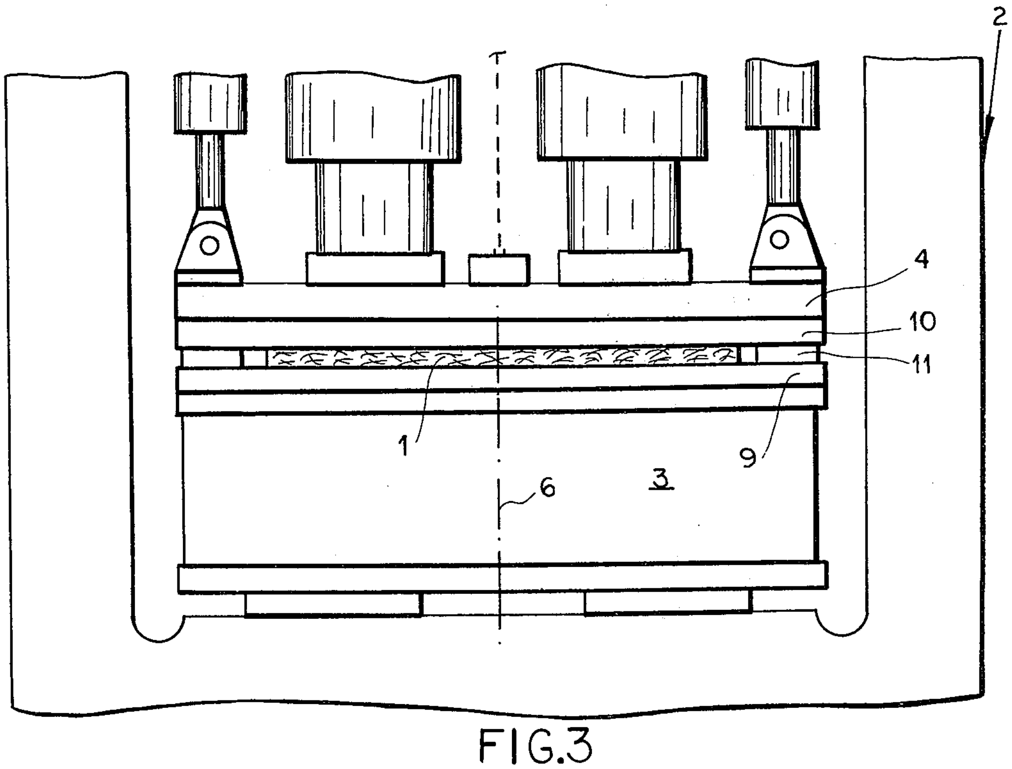

FIG. IA is a detail view, drawn to an enlarged scale, of the portion IA of FIG. 1;

FIG. 2 is an elevational view of a portion of the press shown in FIG. 1 upon closing of the press to the statically determined position of the movable press bed on the spacer bars; and FIG. 3 is a view similar to FIG. 2 but showing the press in its position for parallel pressing.

SPECIFIC DESCRIPTION

In the drawing I have shown a single-level platen press for the compaction of particle-board mats 1 in the manufacture of chipboard, fiberboard, asbestos board or the like.

The press comprises a support 2 in the form of a number of spaced-apart portal frames, only one of which has been illustrated but others of which can be provided as shown in U.S. Pat. No. 3,860,381. A rigid fixed press bed 3 is mounted on this support and is juxtaposed with a movable press bed 4.

A plurality of working cylinder arrangements 5 are provided symmetrically with respect to a longitudinal vertical medium plane 6 through the press.

More particularly, each of the main cylinder arrangements 5, of which two are provided in each frame, can include a cylinder proper 5*a*, a piston 5*b* axially shiftable in this cylinder 5*a* and a pedestal 5*c*, bearing upon the respective beam 4*a* to which the press plate 10 of the movable bed 4 is attached.

Similarly, a plurality of symmetrically disposed auxiliary cylinder arrangements 7 can be provided outwardly of the main cylinders 5. Two such auxiliary cylinder arrangements, each including a cylinder proper 7*a* and a piston 7*b* can be mounted in each frame.

The hydraulic control for the cylinders 5 is shown at 8 and can include a hydraulic servomechanical system as described in SERVOMECHANISM PRACTICE, McGraw-Hill Book Company, New York, N.Y., 1960 (pages 390 ff).

Naturally, a retraction system can be provided, if the cylinders are not double-acting, to raise the movable platen into the position shown in FIG. 1.

Furthermore, although this cannot be seen from the drawing, each cylinder 5 or 7 represents a row of corresponding cylinders disposed one behind the other along the length of the press. Furthermore, the press plates 9 and 10 can be heated, e.g. by electrical means of a fluid system.

The press plates 9 and 10 cooperate with spacer bars 11 disposed along the longitudinal edges of the plates 9 and 10. According to the invention, the cylinders 7 serve as bearing cylinders and apply force to the movable bed 4 in axial alignment with the centerlines 13 of the spacer bars 11.

The control arrangement 8 is provided with an input from a deformation measuring device such as a strain gauge system 14 (pages 343 ff. of SERVOMECHANISM PRACTICE) which measures the deformation of the movable press bed. Pickups for the strain gauge system 14 have been represented diagrammatically at 16.

From the position shown in FIG. 1, the movable bed 4 is brought into contact with the mat 1 and then the bearing cylinders 7 are actuated to bring about contact between the bed 4 and the spacer bars 11 which thereupon support the movable bed in a statically determined starting position. The strain gauge 14 measures the deformation of the platen (FIG. 2) and provides an input to the control system 8 to power the main cylinders 5 to remove the deformation and ensure parallel compression. Further compressing is effected in parallelity (FIG. 3).

Hinges or pivots 15 are provided between the cylinders 7 and the support 2 on the one hand and the movable bed 4 and the width B of the spacer bars 11 is selected so that the application of the bearing pressure does not cause permanent deformation of the movable bed.

I claim:

1. A method of operating a platen press for plane-parallel compression of a particleboard mat to produce particleboard of a predetermined thickness, comprising:

(a) placing upon a lower fixed platen and beneath an upper movable deformable platen of said press, a mat to be formed into particleboard;

(b) placing upon said fixed lower platen and along each longitudinal edge of said mat rigid bars having said predetermined thickness;

(c) moving downwardly said upper platen to compress said mat until said upper platen contacts said bars, while deforming upwardly said upper platen at locations intermediate said bars by contact with said mat, (d) measuring said deformation of said upper platen; and (e) applying to said deformed intermediate locations of said upper platen controlled pressure responsive to said measured deformation of said upper platen to reform said upper platen for plane-parallel compression of said mat, and to form said particleboard to a uniform thickness corresponding to the thickness of said bars.

* * * * *